United States Patent [19]

McManigal

[11] Patent Number: 5,253,051

[45] Date of Patent: Oct. 12, 1993

[54] VIDEO ARTIFICIAL WINDOW APPARATUS

[76] Inventor: Paul G. McManigal, 16 Inverness La., Newport Beach, Calif. 92660

[21] Appl. No.: 664,800

[22] Filed: Mar. 5, 1991

[51] Int. Cl.$^5$ .............................................. H04N 7/18
[52] U.S. Cl. ..................................... 358/104; 358/93; 358/83; 433/72; 40/152; 362/125
[58] Field of Search ................... 358/93, 83, 104, 108, 358/254, 229; 434/76, 78, 79, 72; 52/777, 764; 40/427, 152; 362/125

[56] References Cited

U.S. PATENT DOCUMENTS

| | | |
|---|---|---|
| 502,991 | 6/1894 | Howard . |
| 920,593 | 5/1909 | Leslie . |
| 1,346,705 | 7/1920 | Gibson . |
| 1,429,802 | 9/1922 | Thompson . |
| 1,520,729 | 12/1924 | Stoewsand . |
| 1,525,309 | 2/1925 | Lund . |
| 1,546,089 | 7/1925 | Leachman et al. . |
| 1,607,922 | 11/1926 | Schweitzer . |
| 1,652,636 | 12/1927 | Paul . |
| 1,725,230 | 8/1929 | Ulrich . |
| 1,804,651 | 5/1931 | Shipman . |
| 1,820,912 | 9/1931 | Kelly . |
| 1,846,533 | 2/1932 | Thompson . |
| 1,882,647 | 10/1932 | Kanolt . |
| 1,930,359 | 10/1933 | Hilgenberg . |
| 2,043,193 | 6/1936 | Dunn et al. . |
| 2,062,887 | 12/1936 | Karst . |
| 2,107,641 | 2/1938 | Malcomson . |
| 2,163,763 | 6/1939 | Ray . |
| 2,197,965 | 4/1940 | Booth . |

(List continued on next page.)

FOREIGN PATENT DOCUMENTS

| | | | |
|---|---|---|---|
| 413323 | 7/1910 | France . | |
| 0133534 | 10/1981 | Japan | 358/93 |
| 0117882 | 7/1984 | Japan | 358/108 |
| 2084461 | 4/1982 | United Kingdom . | |

OTHER PUBLICATIONS

Radio and Television News; Nov. 1948 office telesets p. 45.
"CCTV System Aids Plant Security", Electrical World, Jan. 26, 1970, p. 30.
Home Mechanix, Feb. 1988, "Window Mirror", p. 20.

Primary Examiner—Victor R. Kostak
Assistant Examiner—Michael H. Lee
Attorney, Agent, or Firm—William W. Haefliger

[57] ABSTRACT

An artificial window comprising, in combination a frame having room window configuration to be supported within a room; video structure including a display encompassed by the frame; and control structure for the video structure to effect video presentation at the display, and to a viewer within the room, of a selected scene outside the room, and characterized as having an associated window size boundary as viewed by the viewer.

5 Claims, 5 Drawing Sheets

U.S. PATENT DOCUMENTS

| | | |
|---|---|---|
| 2,323,059 | 6/1943 | Land . |
| 2,522,812 | 9/1950 | Bonnet . |
| 2,523,290 | 9/1950 | Gardner . |
| 2,634,530 | 4/1953 | Herschede et al. . |
| 2,653,313 | 12/1952 | Fuchs . |
| 2,654,827 | 10/1953 | Pierce . |
| 2,702,440 | 2/1955 | Marchand . |
| 2,814,895 | 12/1957 | Flam . |
| 2,824,399 | 2/1958 | Neugass . |
| 2,861,173 | 11/1958 | Nordquist . |
| 2,902,787 | 9/1959 | Cook . |
| 3,024,701 | 3/1962 | Marks et al. . |
| 3,054,204 | 9/1962 | Yates . |
| 3,124,639 | 3/1964 | Kahn . |
| 3,184,594 | 5/1965 | Siegel . |
| 3,271,568 | 9/1966 | Lundberg . |
| 3,289,342 | 12/1966 | Gibson, Jr. . |
| 3,294,964 | 12/1966 | Schwartz . |
| 3,324,290 | 6/1967 | Lasker . |
| 3,492,486 | 1/1970 | Bischoff et al. . |
| 3,602,590 | 8/1971 | Lukens . |
| 3,629,965 | 12/1971 | Heindl, Jr. . |
| 3,688,424 | 9/1972 | Von Zanten . |
| 3,725,563 | 4/1973 | Woycechowsky ............. 358/104 |
| 3,755,664 | 8/1973 | Reiback . |
| 3,771,245 | 11/1973 | Mabrey et al. . |
| 3,829,998 | 8/1974 | Flax . |
| 3,997,991 | 12/1976 | Hayman-Chaffey et al. . |
| 4,021,949 | 5/1977 | Niehaus et al. . |
| 4,034,494 | 7/1977 | Lane . |
| 4,071,748 | 1/1978 | Dey . |
| 4,118,111 | 10/1978 | Laesser . |
| 4,123,141 | 10/1978 | Schuler . |
| 4,132,464 | 1/1979 | Maeno . |
| 4,185,407 | 1/1980 | Lamb . |
| 4,206,501 | 6/1980 | Brooks . |
| 4,244,130 | 1/1981 | Frois . |
| 4,261,125 | 4/1981 | Rappaport . |
| 4,267,489 | 5/1981 | Morohashi . |
| 4,318,163 | 3/1982 | Bryan . |
| 4,386,476 | 6/1983 | Schulman . |
| 4,414,767 | 11/1983 | Staton . |
| 4,418,378 | 11/1983 | Johnson . |
| 4,469,726 | 9/1984 | Niinivuo . |
| 4,475,126 | 10/1984 | Akins ................. 358/254 |
| 4,475,298 | 10/1984 | Munoz . |
| 4,542,449 | 9/1985 | Whitehead . |
| 4,587,754 | 5/1986 | Ossner . |
| 4,637,150 | 1/1987 | Geluk . |
| 4,649,462 | 3/1987 | Dobrowolski et al. . |
| 4,752,836 | 6/1988 | Blanton et al. .............. 358/104 |
| 4,922,384 | 5/1990 | Torrence . |
| 4,999,710 | 3/1991 | Senso et al. ............. 358/140 |

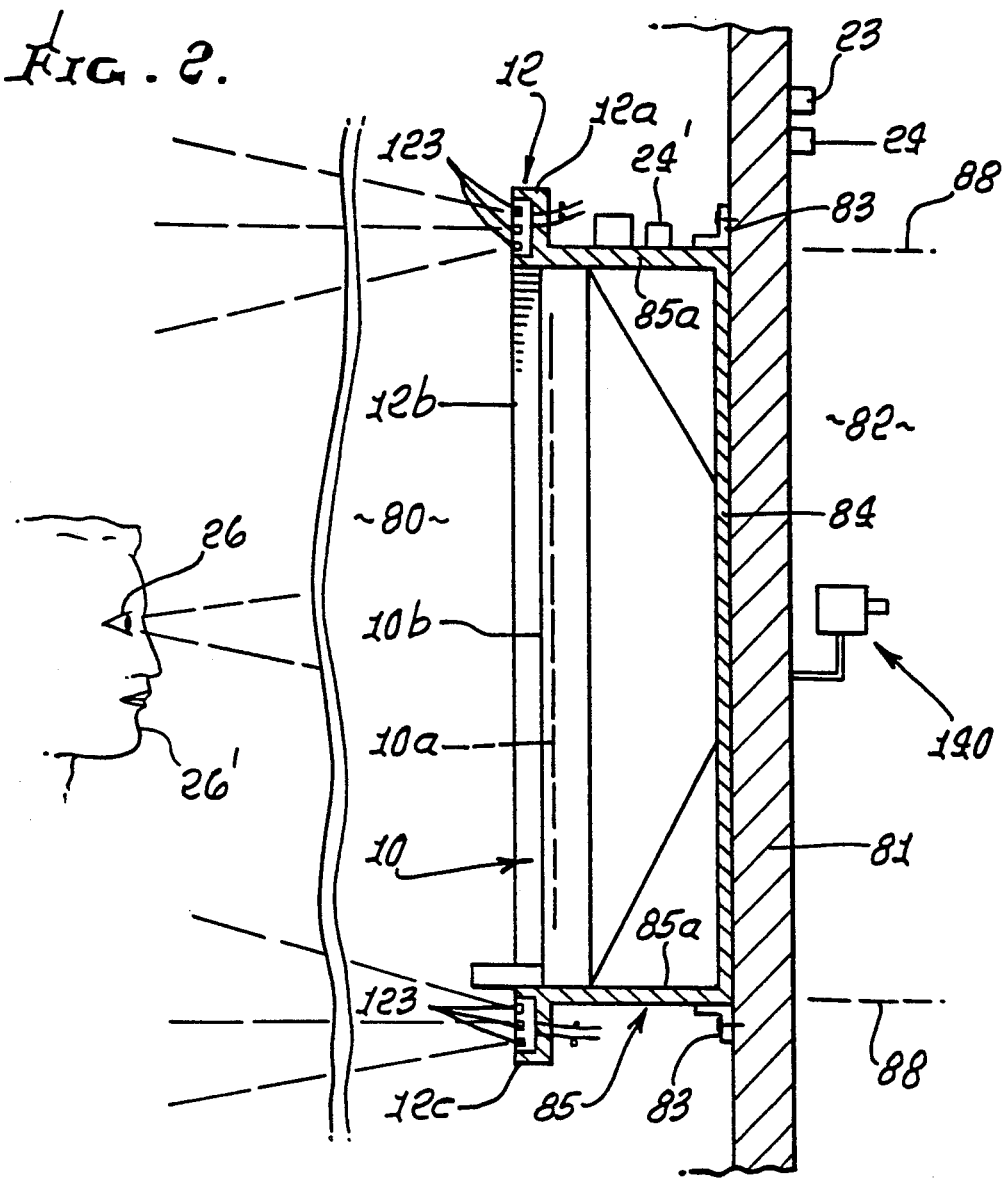
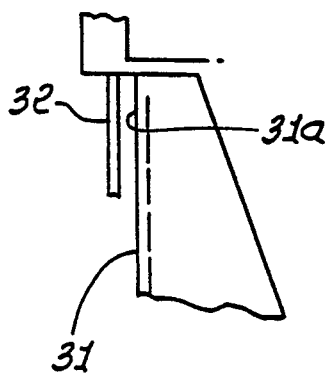
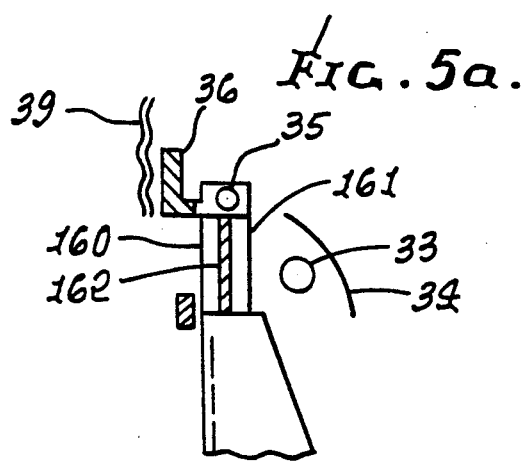

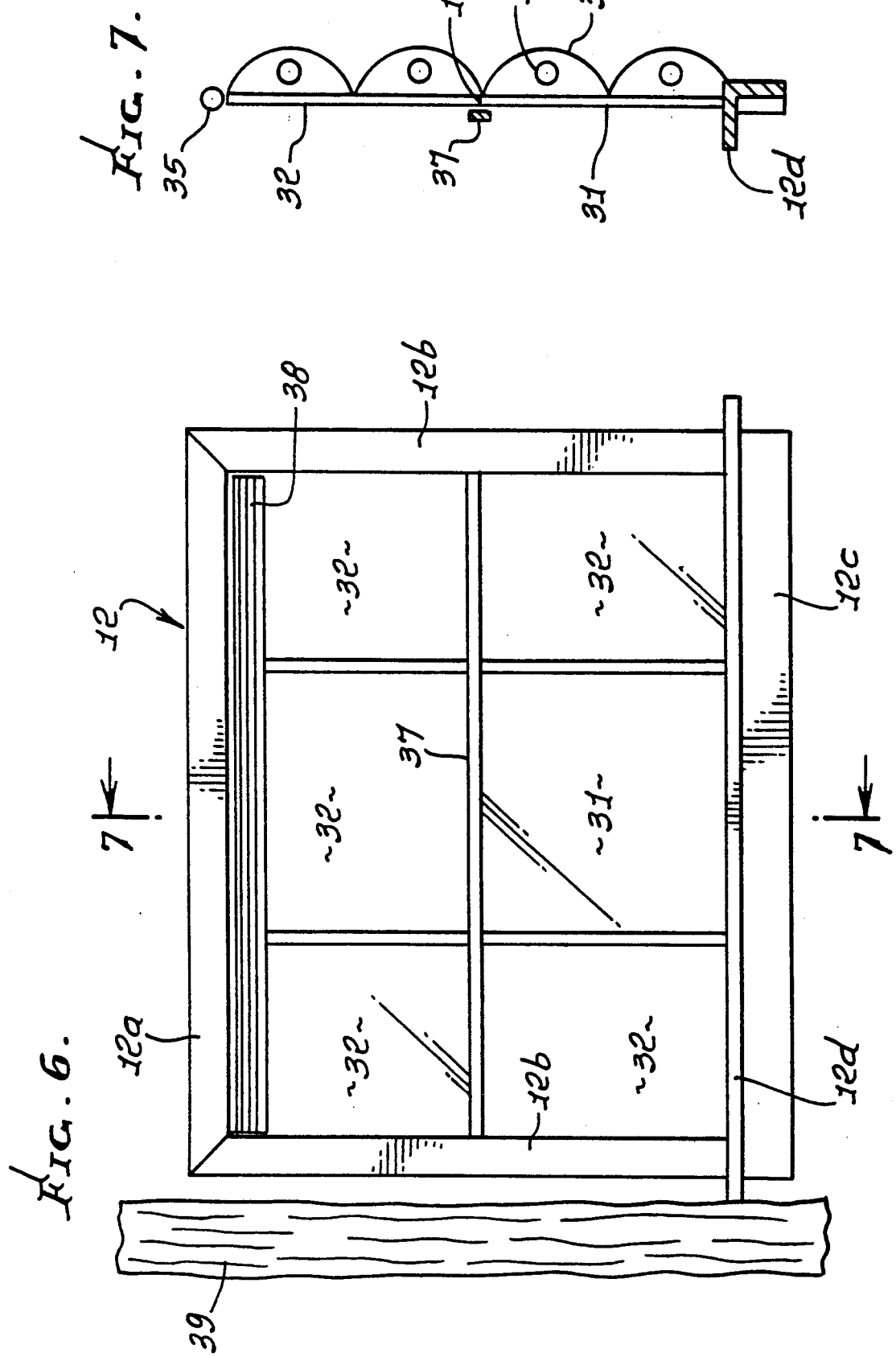

VIDEO ARTIFICIAL WINDOW APPARATUS

BACKGROUND OF THE INVENTION

This invention relates generally to artificial windows, and more particularly to improvements in such windows whereby selected scenes, as from the exterior or remote exteriors, appear at the viewing surface of the window, as viewed for example from a room interior.

There are millions of windowless offices in the United States alone. Also, there are many basements which have no windows. Also, windows in highrise buildings often look out on light wells which do not afford interesting views.

Recently, artificial windows have been proposed to include backlit transparencies on which scenes are depicted, as for example seashores with sand and ocean, pastoral scenes, etc. These are viewed from the interior of a room and maintained in such manner that the viewer gains the impression that he is looking through an actual window to the exterior. Such artificial windows have many benefits, but generally lack scene shifting or movement, and thus are less credible than they might otherwise be. Accordingly, there is a need for such improvements in artificial windows which can enhance the realism of the scene portrayed, particularly scene relative shifting as the viewer moves about the room.

SUMMARY OF THE INVENTION

It is a major object of the invention to provide an artificial window construction or constructions which meet the above need. Basically, the apparatus of the invention comprises:

a) a frame having room window configuration to be supported within a room, b) video means including a display encompassed by the frame, c) and control means for the video means to effect video presentation at the display, and to a viewer within the room, of a selected scene outside the room, and characterized as having an associated window size boundary as viewed by the viewer.

As will appear, the construction may be such as provides for modification of the selected scene as a function of the position of the viewer in the room; and for this purpose, sensor means may be provided for sensing the position of the viewer in the room relative to the frame referred to above, the sensor means operatively connected to the video means to provide such scene modification. For example, the viewed scope of the selected scene, as presented at the video display, may be made to correspond to the azimuth and elevation of the viewer relative to the frame, and to the distance of the viewer from the frame.

It is a further object of the invention to provide a video display in the form, for example, of a liquid crystal display; and the video means may include circuitry for presenting the display as a high definition display.

In addition, the video means may include one or more of the following:

i) a video player
ii) an optical disc player
iii) a video data reader for reading compressed data
iv) a digital memory
v) compressed data video circuitry
vi) broadcast television
vii) cable television.

A further object includes the provision of remote camera means for transmitting to the video means signals corresponding to the selected scene outside the room. Additionally, the frame may be positioned in the room and relative to the exterior of the room such that the selected scene presented at the video display corresponds to the sam scene as would be viewed by the viewer looking at the exterior along a line or lines of view extending from the viewer through the frame and to the exterior.

Yet another object of the invention is to provide auxiliary scene-presenting means encompassed by the frame as viewed by the viewer. Such auxiliary means, for example, including a translucent film means. In this regard, an enclosure may be provided at the rear of the film means, together with backlighting means associated with the film means for illuminating the film means from the rear side thereof. The auxiliary scene presenting means may also be oriented to extend in such adjacency to the video display means as to provide an extension of the selected scene.

Additional objects include the provision of sound-producing means associated with the video means to produce sound or sounds related to the selected scene; and scent-producing means associated with the video means to produce scent or scents related to the selected scene.

These and other objects and advantages of the invention, as well as the details of an illustrative embodiment, will be more fully understood from the following specification and drawings, in which:

DRAWING DESCRIPTION

FIG. 2 is a vertical section taken through FIG. 1 on lines 2—2;

FIGS. 5 and 5a are fragmentary sections showing modifications;

FIG. 6 is a front view of an artificial window, with mullions; and

FIG. 7 is a section on lines 7—7 of FIG. 6.

DETAILED DESCRIPTION

Figure 1:
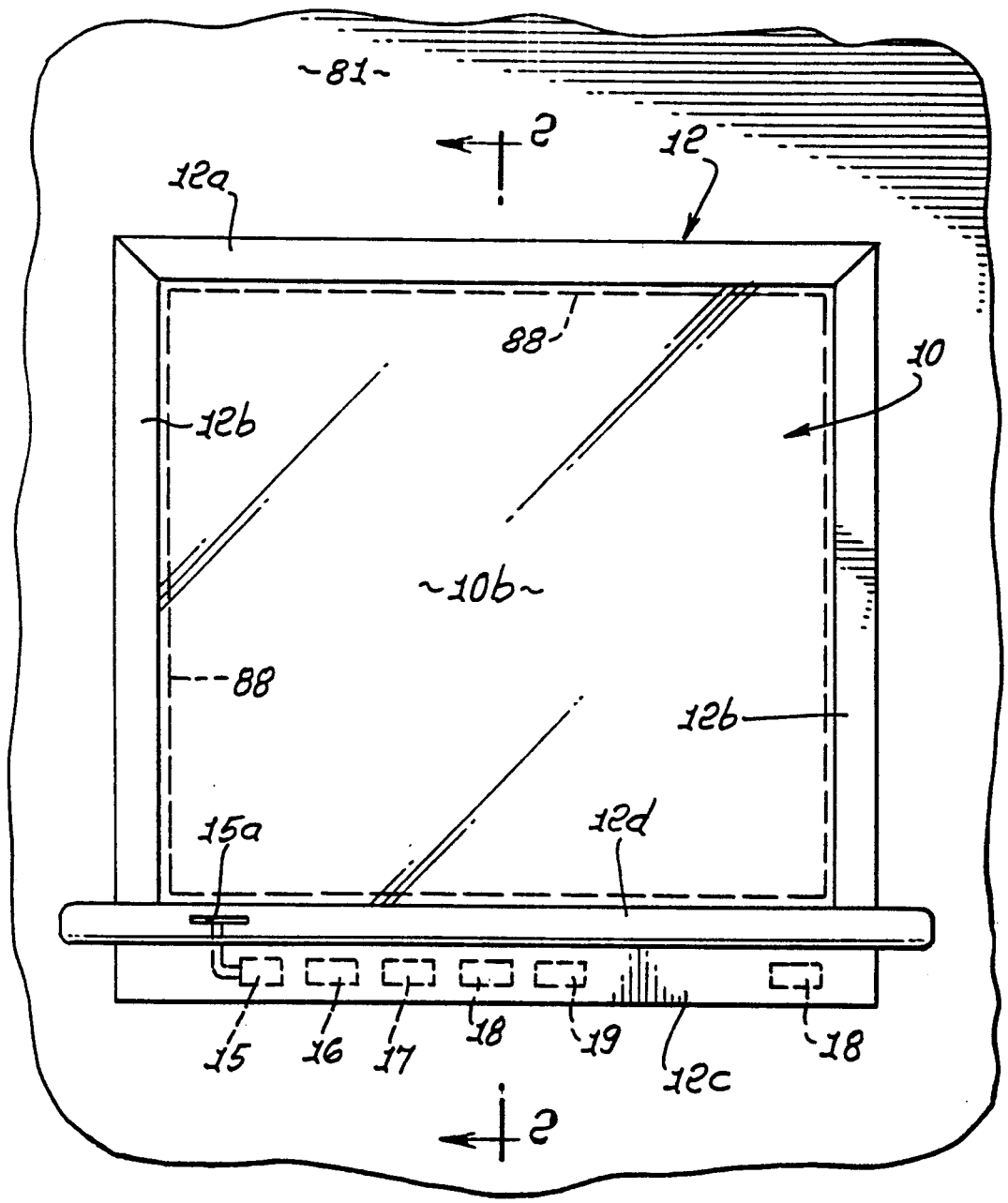
FIG. 1 is a front view of an artificial window incorporating the invention.

In FIGS. 1 and 2, a frame 12 has a room window configuration, and may include upper horizontal member 12a, vertical side members 12b, a bottom horizontal member 12c, and a horizontal sill 12d projecting as shown. It is configured to be supported within a room chamber, the interior of which is indicated at 80. The building wall is indicated at 81, and the exterior at 82. Merely as illustrative, the frame may be supported on wall 81, as by supports 83; also a frame rear wall 84 may be provided whereby a box-like unit 85 is provided, opening forwardly toward the observer's eye 26. See box side members 85a.

A video means is provided, as for example is indicated at 10, and it includes a display at 10a, the latter for example provided by a video CRT screen. An associated glass front panel is shown at 10b. The video means 10 is typically supported by the frame 12, as bordered by members 12a and 12b; and it may be of extremely flat-type, whereby the frame 12 may be close to wall 81.

Control means is provided for the video means to effect video presentation at the display, and to a viewer 26' within the room of a selected scene outside the room, as for example the landscape at exterior 82, and viewable as from the room interior, were an actual window present in the wall 81, as within a boundary represented by broken lines 88, generally conforming to the window side boundary of the display 10a. Thus, the selected scene, as displayed, is characterized as having an associated window side boundary, as viewed by the viewer, the realism enhanced by virtue of the presence of window frame 12 in close association with the video means.

Figure 2A:
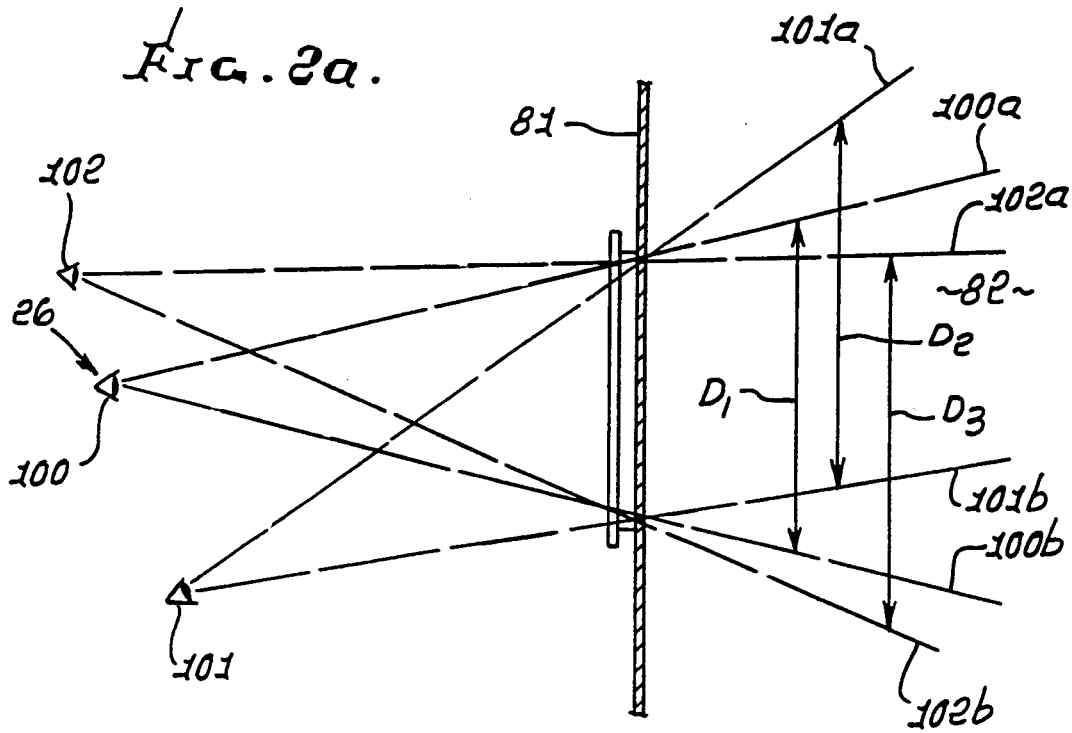
FIG. 2a is a block diagram.

Referring now to FIG. 2a, if the viewer's eye 26 is at position 100, and if a window (corresponding to the video display) were present in wall 81, the scope of the exterior scene to be viewed would be subtended by view lines 100a and 100b. The scene thus being represented by vertical scope line $D_1$. If his eye 26 were at position 101, his view lines would be at 101a and 101b, and the external scene would be represented by vertical scope line $D_2$; and if his eye were at position 102, his view lines would be at 102a and 102b, and the external scene represented by vertical scope line $D_3$. In accordance with the invention, the scope of the selected scene, for example at the exterior 82 (but possibly at other exterior locations not outside room interior 80) displayed at 10a, corresponds to the position of the eye relative to the frame 12; thus, it will correspond to at least one of, and preferably three of the following:

the elevation of the viewer relative to the frame;
the azimuth of the viewer relative to the frame;
the distance of the viewer from the frame.

Figure 2B:
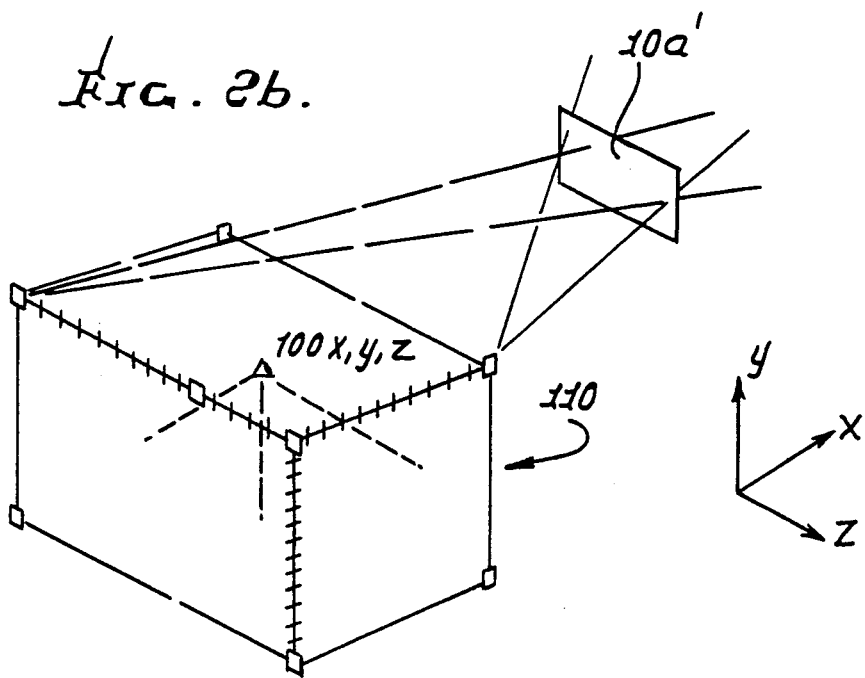
FIG. 2b is a perspective showing principles of operation.
Figure 3:
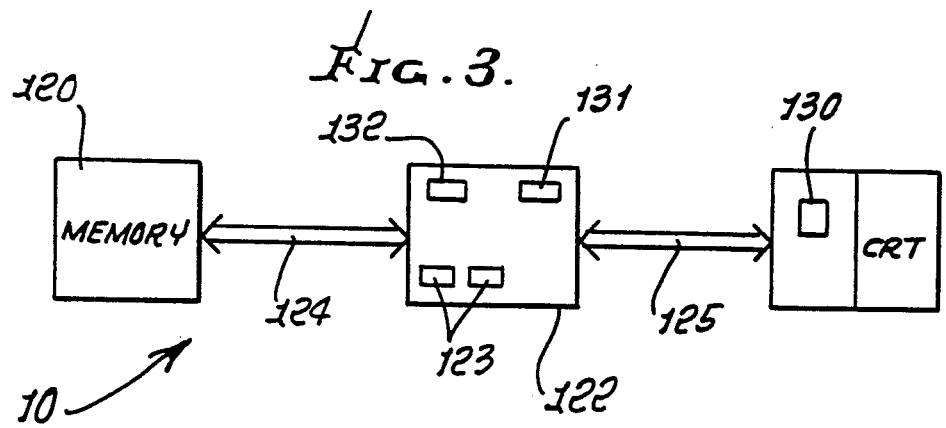
FIG. 3 is a block diagram.

Reference to FIG. 2b shows the above pictorially. Possible eye positions are indicated by any of a series of positions: $100_y$ along a "y" axis (elevation), position $100_x$ along an "x" axis (distance of the viewer from the frame); and position $100_z$ along a "z" axis (azimuth relative to the frame or to the boundary $10_a'$ of the video display 10a). A large number of such positions in a three-dimensional matrix 110 are represented in FIG. 2a, and the spacings of the positions can be varied. If a video camera views the exterior from all of such positions, and each scenic view (corresponding to the different camera positions) is stored in memory 120 (see FIG. 3) then video data corresponding to each of such views can be selectively recovered for presentation on the video display 10a, as by the CRT, and under control of the control circuitry 122. See data buses 124 and 125.

Control 122 may incorporate one or more sensors 123, also seen in FIG. 2, operable to sense the position of the viewer 26' in the room, and relative to the frame, and to the display 10a, to modify the selected scene displayed at 10a as a function of the position of the viewer in the room. Thus, if the viewer or his head is at a position corresponding coordinates $110_{x1}$, $110_{y4}$ and $110_{z0}$, the sensor or sensors sense that position and cause the control to gate to the CRT, the stored video data corresponding to that position, whereby the viewer's view corresponds to the exterior as it would be seen as a function of his position relative to the artificial "window" (CRT) frame and display.

The video display may include a liquid crystal display, and the video means may include circuitry (see 130 in FIG. 3) for presenting the display as a high definition display (selected large number of raster lines, etc., as is known). The video means 10 may include one or more of the following:

i) a video player 131
ii) an optical disc player
iii) a compressed data
iv) a digital memory
v) compressed data video circuitry
vi) broadcast television
vii) cable television.

Instead of the memory 121, as described, for storing the views represented in FIG. 2b, the input to the video means can be from a camera represented at 140 in FIG. 2, and suitably driven to swivel in three dimensions and HOLD at a swiveled position corresponding to the position of the viewer 26' in the room from which he would view the external scene were there an actual window bounded by lines 88, as referred to above. This corresponds, then, to frame 12 positioning in the room and relative to the exterior of the room such that the selected scene presented at the video display corresponds to the same scene as would be viewed by the viewer looking at the exterior along a line or lines of view extending from the viewer through the frame and to the exterior. The camera may be at a location to record a scene corresponding to the viewer's position relative to frame 12.

Figure 4:
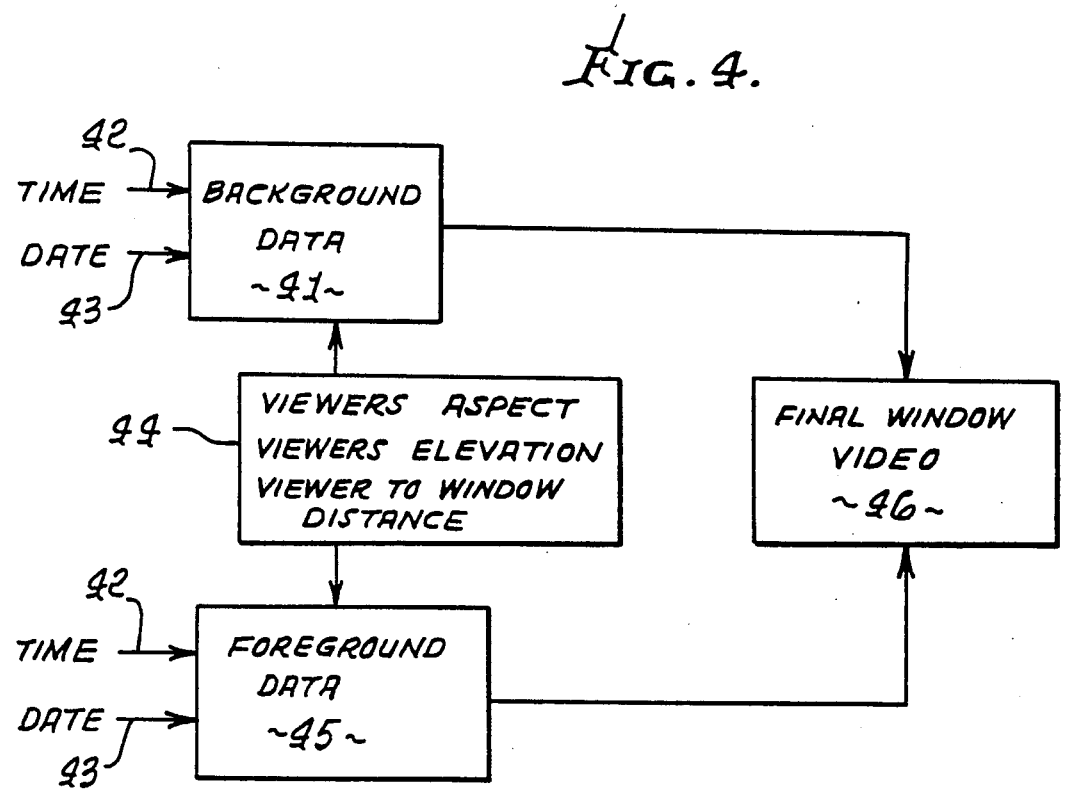
FIG. 4 is a block diagram.

FIG. 4 shows how the video data is prepared or compiled to change perspective and aspect angle depending upon the position, elevation, and the distance of the viewer from the window. Even if the video is not to change with the position of the viewer, it may with time of day input 42 and date input 43. These changes can account for daily lighting and seasonal variations. The difference between the background data 41 and the foreground data 45 consists in the way that they "react" to the elevation of the viewer and the viewer's aspect angle from the window and the distance of the viewer from the window 44. Both sets of data are also combined into the final window video 46. Various background data will be obscured by the foreground objects, of course.

Background objects move up when the viewer's elevation moves up, while the foreground objects do not. Also, the background objects change only in magnification and field of view as the viewer distance to the window and aspect changes. The aspect angle of the foreground detail changes: one sees the side of a trunk of a tree immediately in front of the window.

As the viewer's eye position changes to a different position at the same distance from the window, there is no change in the apparent size of all objects. There is a slight change in the immediate foreground objects in that a different aspect is shown. There is very little change in the position of the foreground objects. There is no change in the aspect of the background. However, as the viewer's eye position shifts, there is a very different background scene, certain objects now being seen, while other objects cannot be seen.

As the viewer now moves to a position which is closer to the window from a previous position, we have the following changes: More of the background is now seen, while all of the background objects appear to be the same size to the viewer since they subtend the same angles, their size on the screen being actually reduced. Objects in the immediate foreground are unchanged in size on the screen, but they appear larger to the viewer since they subtend a larger angle to the viewer.

These changes can be summed up by the following table:

| Changes in: | Immediate foreground | Midground | Background |
|---|---|---|---|
| Viewer's aspect angle | | | |
| Position of objects | very little | some | large |
| Detail of objects (aspect angle changes) | yes | some | none (unless obscured) |
| Viewer moves to window | | | |
| Object angular size | grows | grows somewhat | constant |
| Size on screen | constant | somewhat smaller | smaller |

Regarding the above-referenced viewer position sensors, they can be infrared, optical or acoustic. The former two may use change detection and rudimentary pattern recognition. This process can be simplified if the viewer is willing to wear an object which aids the tracking, such as an RF repeater or a corner cube reflector which could reflect RF or laser pulses. In addition, a video sensor 23 is shown in FIG. 2 external to the building along with a microphone 24 connected with a speaker 24' on the frame to capture external sounds transmitted as added signals. The video sensor may be slaved in angle and magnification to the position of the viewer.

FIG. 5 shows a combined video and backlit transparency artificial window. In the lower central portion of the window is the video screen 31. The remaining portions of the window incorporate backlit transparency 32. The transparency 32 depicts a scene and ca be caused to change time of day and illumination color etc., by CRT illumination of the screen region 31a behind the transparency, or by using the elements of application Ser. No. 652,779 (McManigal, "Artificial Window"). Among these, with reference to FIG. 5b, are light tubes 33 and reflectors 34, and light tubes 35 for edge illumination of plastic sheets 160 and 161 between which a scene depicting transparency film 162 is retained. Both sets of light tubes are controlled by dimmers, not shown. The transitions 165 between the transparency and the video screen can be covered by elongated mullions 37, whereby the two scenes depicted blend. The window frame 36 can be covered by Venetian blinds or drapes or curtains 39. See also FIGS. 6 and 7.

Referring back to FIG. 1, an air blower 15 blows air to emanate from a slit 15a in the sill. The video data can be stored in either the digital memory 16 or the optical memory 17. In either case, the data can be condensed in order to be able to handle a variety of aspects, motion, lighting, seasonal changes, and movement, such as blowing leaves and animal or people visitors to the scene. Not only can data be compressed, it can be composed from basic pictorial elements in order to be able to handle all the necessary varieties of scenes.

The oral and olfactory senses can be stimulated through the use of the speakers 18 and the scent pot 19. These items can be made to coordinate with the video scene and the time of day and year. (For example, the birds can sing at dawn and the crickets in the summer evening, as shown by a corresponding scene at 10a. If the scene has orange blossoms, then the scent of orange may be appropriate, for example.

From the foregoing, it will be seen that the invention allows many of the advantages of a window looking out onto a very interesting outdoor scene where there is no window.

Benefits of windows include: psychic benefits and relief from depression. Many people enjoy looking at an interesting window scene.

A special feature of this window is the ability to change the aspect angle and the magnification of the scene depending upon the position of the viewer. A sensor system to determine the position of the viewer is included.

Another purpose of the invention is to camouflage a television in a location where it can be:

useful as an artificial window, easily viewable when it is desired to see broadcast or cable TV;

camouflaged when not desired to be used as a video unit, by drawing curtains or blinds or similar.

Another purpose of the invention is the combination of a video and a backlit transparency. This combination can be much larger than the video unit alone while the cost is still affordable.

I claim:

1. An artificial window comprising, in combination:
   a) a frame having room window configuration to be supported within a room,
   b) video means including a display encompassed by the frame,
   c) and control means for said video means to effect video presentation at the display, and to a viewer within the room, of a selected scene outside the room, and characterized as having an associated window size boundary as viewed by the viewer,
   d) and including sensor means for sensing the position of the viewer in the room relative to said frame and operatively connected to said video means to modify said selected scene as a function of said position of the viewer.

2. The combination of claim 1 wherein said sensor means includes means operatively connected to said video means to cause the scope of said selected scene, as presented at the display, to correspond to at least one of the elevation of the viewer relative to the frame, the azimuth of the viewer relative to the frame, and to the distance of the viewer from the frame.

3. An artificial window comprising, in combination:
   a) a frame having room window configuration to be supported within a room,
   b) video means including a display encompassed by the frame,
   c) and control means for said video means to effect video presentation at the display, and to a viewer within the room, of a selected scene outside the room, and characterized as having an associated window size boundary as viewed by the viewer, and
   d) including an auxiliary scene-presenting means encompassed by said frame as viewed by the viewer, wherein said auxiliary scene presenting means extends in such adjacency to said video display means as to provide an extension of said selected scene, and said video means extending rearwardly of said auxiliary scene presenting means to provide backlighting therefore.

4. The combination of claim 3 wherein said auxiliary means includes a translucent film means.

5. The combination of claim 4 including an enclosure at the rear of said film means, and backlighting means associated with said film means for illuminating the film means from the rear side thereof.

* * * * *